United States Patent [19]
Regal et al.

[11] Patent Number: 5,692,137
[45] Date of Patent: Nov. 25, 1997

[54] MASTER ORIENTED BUS BRIDGE

[75] Inventors: Michael L. Regal, Campbell; Charles M. Flaig, Cupertino, both of Calif.

[73] Assignee: Apple Computer, Inc., Cupertino, Calif.

[21] Appl. No.: 436,987

[22] Filed: May 8, 1995

[51] Int. Cl.⁶ .......................... G06F 13/00; G06F 13/38; G06F 13/40

[52] U.S. Cl. .................. 395/309; 395/308; 395/872; 395/250

[58] Field of Search .................. 395/306, 308, 395/309, 325, 250, 800, 880, 872

[56] References Cited

U.S. PATENT DOCUMENTS

| | | | |
|---|---|---|---|
| 4,218,740 | 8/1980 | Bennett et al. | 395/250 |
| 5,261,057 | 11/1993 | Coyle et al. | 395/308 |
| 5,278,957 | 1/1994 | Chan | 395/250 |
| 5,295,246 | 3/1994 | Bischoff et al. | 395/250 |
| 5,339,395 | 8/1994 | Pickett et al. | 395/325 |
| 5,416,907 | 5/1995 | Polzin et al. | 395/886 |
| 5,448,715 | 9/1995 | Lelm et al. | 395/559 |
| 5,535,341 | 7/1996 | Shah et al. | 395/306 |
| 5,594,878 | 1/1997 | Shibata et al. | 395/309 |
| 5,615,382 | 3/1997 | Gavin et al. | 395/800 |

FOREIGN PATENT DOCUMENTS 0530363  3/1993  European Pat. Off. .

OTHER PUBLICATIONS

IBM Corp., "Synchronization And Speed–Tracking Logic for Slave–Driven Transfers", Sep. 1990, vol. 33, No. 4, pp. 423–432.

*Primary Examiner*—Gopal C. Ray
*Attorney, Agent, or Firm*—Burns, Doane, Swecker & Mathis, L.L.P.

[57] ABSTRACT

An interface between two buses in different clock domains. The interface includes a master buffer which is used for both master writes and slave reads. A control logic unit for each bus receives signals from a buffer manager which straddles the clock domains to gate latch pulses to the master buffer.

4 Claims, 3 Drawing Sheets

FIG_1

FIG_2

MASTER ORIENTED BUS BRIDGE

FIELD OF THE INVENTION

The present invention relates to a method of and apparatus for synchronizing data transfer between two buses wherein the buses may operate in two different clock domains.

BACKGROUND OF THE INVENTION

A computer system is generally made up of a group of devices communicating with one another over buses. In communications between two devices, usually one of the devices (the master) issues a command which controls the operation of the other device (the slave). For example, in a write operation, the master will order the slave to receive data, while in a read operation the master will require the slave to send data. The slave accepts the command and may also generate various handshaking signals acknowledging receipt of the command and completion of its task when finished.

Master/slave communications generally require some measure of synchronization between participants. In systems with one master system clock, this requirement is normally satisfied inherently. In systems having multiple clocks, however, it is possible that the master and slave are in different clock domains. Provision must therefore be made in communication between such devices for orderly transfer of data despite the absence of a common clock.

One way to communicate between timing domains is to use a buffer, that is, a synchronizing device which accepts data at the rate it is provided by the data source and holds it to be accessed by the data destination at the destination's rate. The source of data can be from either side of the interface. During a write cycle, the master is the source of the data. During a read cycle, the slave is the source of the data.

A simple buffer implementation provides one buffer for master writes and another buffer for slave reads with each buffer being clocked in the domain of the data source. Most designers utilizing buffers implement data direction buffers clocked from one timing domain. However, this can result in high gate counts when trying to balance flow control concurrently through the bridge between clock domains. Also, to guarantee equal opportunity for masters on both sides of the interface, buffers cannot be shared between masters on opposite sides of the interface. Instead, a particular buffer must be allocated for use exclusively by masters on one side of the interface.

SUMMARY OF THE INVENTION

It is the object of the present invention to provide a method of and apparatus for providing an interface for transferring data between a first bus and second bus wherein the buses operate in different clock domains.

According to one embodiment of the present invention, an interface for transferring data between a first and second bus, wherein the buses operate in different clock domains, is disclosed. Latches transfer data from the first bus to the second bus during a write cycle. The same latches transfer data from the second bus to the first bus during a read cycle. A first bus controller generates a latch pulse to a latch in said first plurality of latches to transfer write data from said first bus to the second bus. A second bus controller generates a latch pulse to a latch in the latches to transfer read data from the second bus to the first bus. A buffer manager synchronizes the data transfers between the two buses by sending control signals to the first and second bus controllers at different times wherein the first and second bus controllers only generate a latch pulse after receiving a control signal from the buffer manager.

In a method according to the invention, a transfer request is first received. The transfer type (read or write) determines which bus (first or second) will issue a latch pulse control signal via a buffer manager. The buffer manager generates a control signal and sends it to a bus controller. The bus controller then generates a latch pulse in response to the received control signal.

DETAILED DESCRIPTION OF THE PREFERRED EMBODIMENTS

The present invention will now be described in connection with a system having two buses respectively labelled bus A and bus B. The buses are assumed to be in different clock domains. In one embodiment of the present invention, bus A may be an Apple RISC bus (ARBus) and bus B a peripheral component interconnect bus (PCI Bus). However, it will be readily apparent to one of ordinary skill in the art that the present invention can be used with a variety of different buses and is not limited to a device which interfaces an ARBus and a PCI Bus.

In the present invention, one latch is used with two clocks and two sets of data. As a result, less silicon is used since a second latch, i.e., one latch for each clock, is unnecessary.

Figure 1:
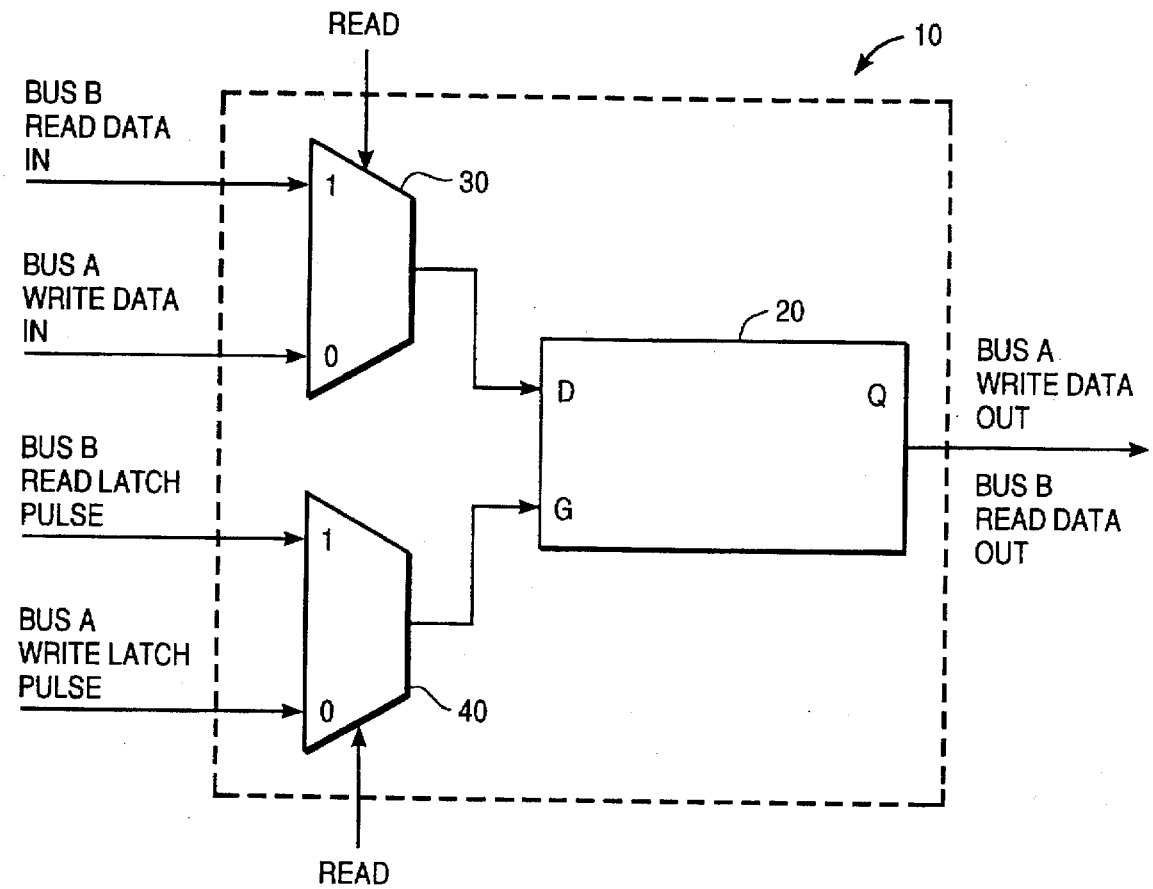
FIG. 1 illustrates a master buffer according to one embodiment of the present invention.

A master buffer 10 is illustrated in FIG. 1. In the example shown, it is assumed that the Bus A communicates directly with a master device in its clock domain and Bus B communicates directly with a slave device in its clock domain. In FIG. 1, the master buffer 10 includes a data latch 20 and two 2:1 multiplexers 30 and 40. The multiplexer 30 has as its inputs a Bus B Read Dam In signal and a Bus A Write Dam In signal. One of these signals is selected as the output of the multiplexer 30 depending in the state of the READ signal which is applied as a control input. In the example shown, if READ is a logic 1, the multiplexer 30 outputs the Bus B Read Data In signal. If READ is a logic 0, the multiplexer 30 outputs the Bus A Write Data In signal.

The multiplexer 40 has as its inputs a Bus B Read Latch Pulse signal and a Bus A Latch Pulse signal. One of these signals is selected as the output of the multiplexer 40 depending in the state of the READ signal which is applied as a control input. In the example shown, if READ is a logic 1, the multiplexer 40 outputs the Bus B Read Latch Pulse signal. If READ is a logic 0, the multiplexer 40 outputs the Bus A Write Latch Pulse signal.

The output of the multiplexer 30 is supplied to the data input D of the data latch 20, which, in the embodiment shown, is a D-type latch. The output of the multiplexer 40 is applied to the latch 20 as a clocking signal. The data applied to the input appears as an output at the output Q in accordance with the applied latch pulses. If READ is logic 0, the data output at Q is Bus A Write Data Out cycled out in accordance with the Bus A Write Latch Pulse. If READ is a logic 1, the data output Q is Bus B Read Data In cycled out in accordance with the Bus B Read Latch Pulse.

Thus, when a master device on Bus A desires to write to bus B, data flows from Bus A to Bus B. Data is made available on Bus A in the form of Bus A Write Data In and the Bus A Write Latch Pulse will cause the latch 20 to open and close which is controlled on the Bus A side. When a read occurs, the Bus B target device makes the Bus B Read Data In available on the B Bus. When the Bus B Read Data In is available, a Bus B Read Latch Pulse will cause the latch 20 to open and close which is controlled on the Bus B side.

It is important to ensure that both latch pulses (the Bus B Read Latch Pulse and the Bus A Write Latch Pulse) never occur concurrently since data integrity may be lost if they do. As a result, there is a need to effectively control the latch pulses to prevent the occurrence of any overlap. The interface disclosed in FIG. 2 effectively controls the latch pulses to prevent the occurrence of an overlap. An interface 50 contains the master buffer 10, a buffer manager 60, a Bus B controller 70, a Bus A controller 80 and two control logic units 90 and 100. In this embodiment of the present invention, the buffer manager 60 is responsible for indicating which of the two control logic units 90 and 100 should issue its latch pulse to the master buffer 10 when the enabled control logic unit is ready to do so.

Figure 2:
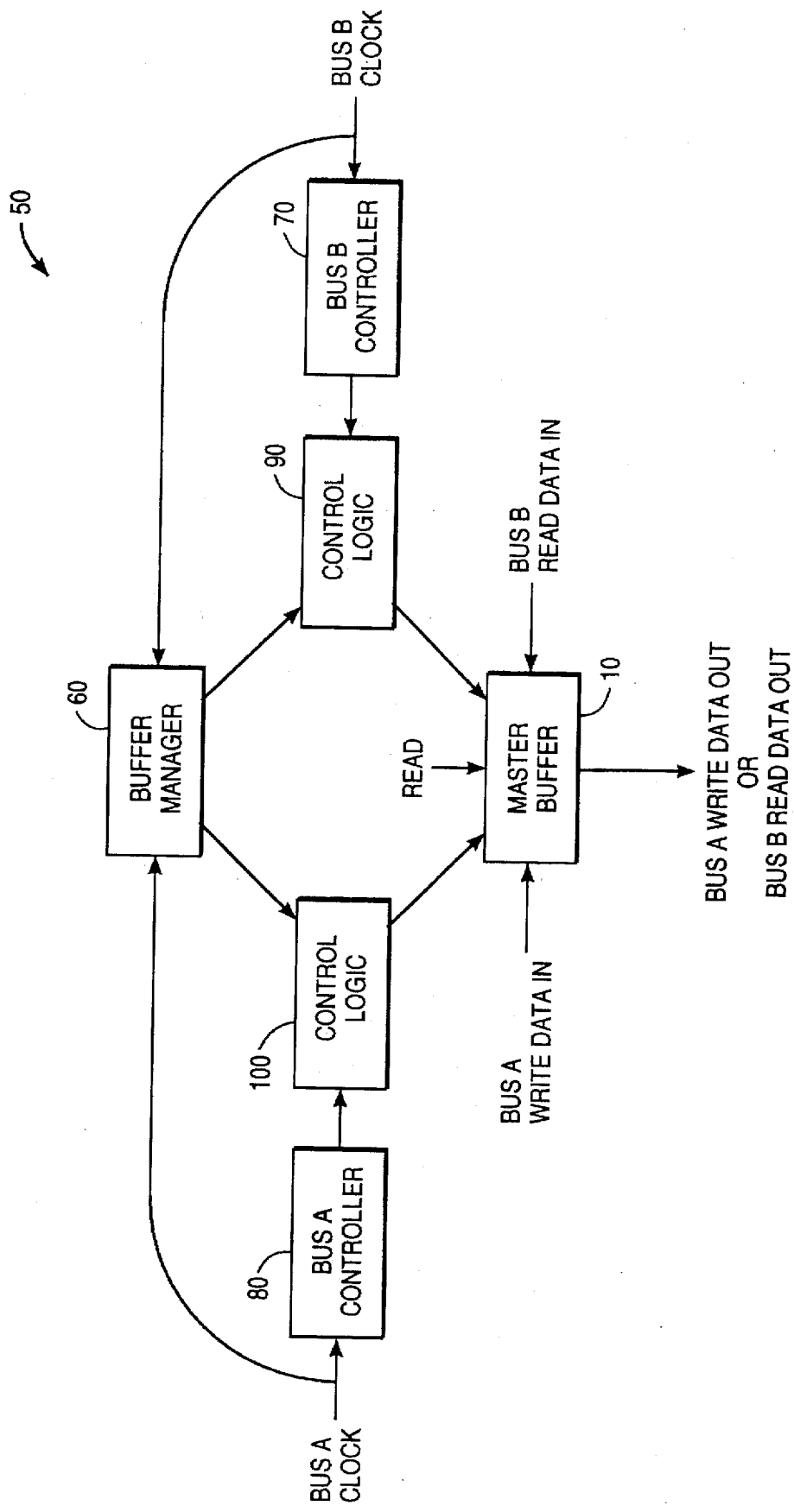
FIG. 2 illustrates an interface according to one embodiment of the present invention.

As illustrated in FIG. 2, the buffer manager 60 receives both the Bus B clock and the Bus A clock. During a read operation, the buffer manager 60 does not issue a control signal to the Bus A control logic unit 100, thereby preventing the Bus A control logic unit from passing through any latch pulse generated by the Bus A controller 80. During the read, the buffer manager 60 instead issues a control signal to the Bus B control logic unit 90 to allow the Bus B control logic unit to pass the latch pulse from the Bus B controller 70.

During a write operation, the buffer manager 60 issues the control signal to the Bus A control logic unit 100, thereby allowing the Bus A control logic unit 100 to pass a latch pulse generated from the Bus A controller 80. During the write, the buffer manager 60 does not issue the control signal to the Bus B control logic unit 90, thereby preventing the Bus B control logic unit 90 from passing any latch pulse from the Bus B controller 70.

When either the control logic unit 90 or the control logic unit 100 receives the control signal from the buffer manager 60 and a latch pulse from either the Bus A controller 80 or the Bus B controller 70, respectively, the control logic unit with the asserted control signal from the buffer manager 60 allows its latch pulse to open and close the master buffer 10. If the buffer manager 60 issues a control signal to the Bus A control logic unit 100, the Bus A control logic unit 100 passes through the Bus A Write Latch Pulse which causes the master buffer 10 to latch the Bus A Write Data In signal. The output of the master buffer 10 reflects the Bus A Write Data In signal. On the other hand, if the buffer manager 60 issues a control signal to the Bus B control logic unit 90, the Bus B control logic unit 90 passes through a Bus B Read Latch Pulse signal from the Bus B controller 70. In response to the Bus B Read Latch signal, the master buffer 10 latches onto the Bus B Read Data In signal. The output of the master buffer 10 reflects the Bus B Read Data In signal.

Figure 3:
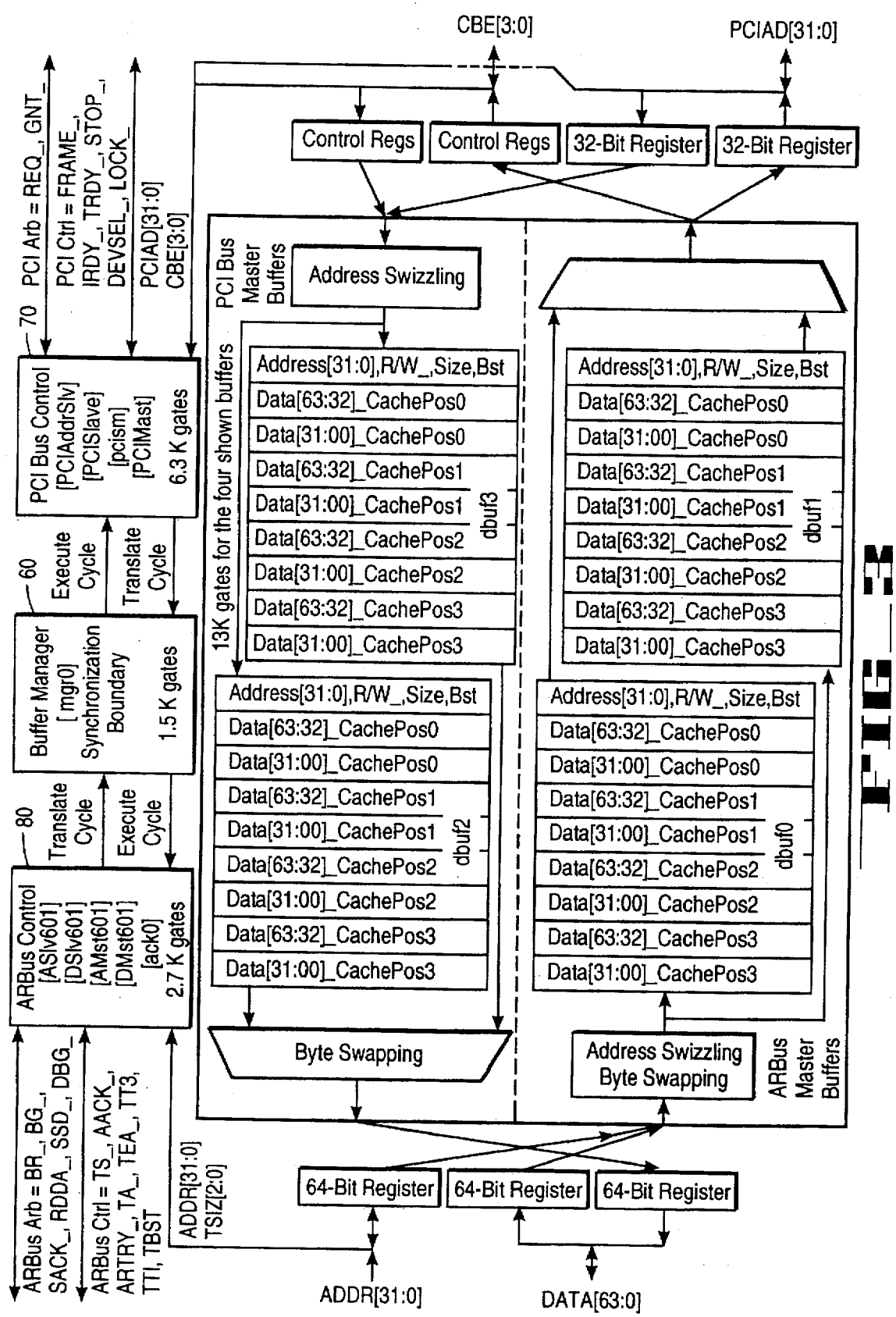
FIG. 3 illustrates a Bandit interface according to one embodiment of the present invention.

A specific implementation of the an interface such as that described above is shown in FIG. 3. FIG. 3 is based on the Apple Bandit interface which is constructed with two state machines, one for the ARBus and the other for the PCI Bus. The two main state machines in turn are made up of smaller sub-state machines. These state machines operate in different clock domains and require that handshake signals be synchronized. Transactions passed between the ARBus and the PCI Bus are staged in a large packet buffer structure. Data Endian conversion is performed on the ARBus side of the packet buffer with data being stored in the packet buffer in PCI Bus Little Endian format. Address Endian swizzling is performed on the master side of a transaction. For a master cycle to the PCI Bus from the ARBus, the address swizzling occurs on the ARBus side. For a master cycle to the ARBus from the PCI Bus, the address swizzling occurs on the PCI Bus side.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appending claims rather than the foregoing description, and all changes which come within the meaning and range of equivalence thereof are intended to be embraced therein.

We claim:

1. An interface for transferring data between a master device on a first bus having timing controlled by a first clock and a slave device on a second bus having timing controlled by a second clock, the interface comprising:

a buffer manager for producing a first control signal when a master write is attempted and a second control signal when a slave read is attempted;

a first circuit, arranged to receive a clock signal from said first clock and said first control signal, for producing a write latch pulse signal based on said first clock signal;

a second circuit, arranged to receive a clock signal from said second clock and said second control signal, for producing a read latch pulse signal based on said second clock signal; and a master buffer, arranged to receive write data from said first bus and read data from said second bus, and arranged to receive said write latch pulse signal and said read latch pulse signal, for producing as an output one of said write data latched by said write latch pulse signal and said read data latched by said read latch pulse signal in accordance with a control signal.

2. An interface as claimed in claim 1 wherein said first circuit comprises a first bus controller connected to said first clock for generating said write latch pulse signal and a first control logic unit arranged to receive said write latch pulse signal from said first bus controller and said first control signal from said buffer manager passing through said write latch pulse signal in response to the presence of said first control signal and blocking said write latch pulse signal in the absence of said first control signal.

3. An interface as claimed in claim 1 wherein said master buffer comprises a data latch.

4. An interface as claimed in claim 3 wherein said control signal is a read signal indicative of an attempted read operation, and wherein said master buffer further comprises a first multiplexer arranged to receive said read data and said write data and producing as an output said write data in the absence of said read signal and said read data in the presence of said read signal, a second multiplexer arranged to receive said read latch pulse signal and said write latch pulse signal and producing as an output said write latch pulse signal in the absence of said read signal and said read latch pulse signal in the presence of said read signal, said data latch having a data input connected to said first multiplexer and a latch pulse input connected to said second multiplexer.

* * * * *